(12) United States Patent
Yuan et al.

(10) Patent No.: US 12,301,272 B2
(45) Date of Patent: May 13, 2025

(54) TECHNIQUES FOR MODIFYING UPLINK COMMUNICATIONS TO AVOID MAXIMUM PERMISSIBLE EXPOSURE (MPE) IN WIRELESS COMMUNICATIONS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/791,479

(22) PCT Filed: Feb. 18, 2021

(86) PCT No.: PCT/CN2021/076690
§ 371 (c)(1),
(2) Date: Jul. 7, 2022

(87) PCT Pub. No.: WO2021/169829
PCT Pub. Date: Sep. 2, 2021

(65) Prior Publication Data
US 2023/0040162 A1 Feb. 9, 2023

(30) Foreign Application Priority Data
Feb. 25, 2020 (WO) ................ PCT/CN2020/076622

(51) Int. Cl.
*H04B 1/3827* (2015.01)
*H04B 7/06* (2006.01)
*H04W 52/36* (2009.01)

(52) U.S. Cl.
CPC ......... *H04B 1/3838* (2013.01); *H04B 7/0695* (2013.01); *H04W 52/367* (2013.01)

(58) Field of Classification Search
CPC .................................................. H04B 1/3838
See application file for complete search history.

(56) References Cited

U.S. PATENT DOCUMENTS

| 10,291,309 B2 | 5/2019 | Chakraborty et al. |
| 2012/0178494 A1 | 7/2012 | Haim et al. |

(Continued)

FOREIGN PATENT DOCUMENTS

| CN | 101895923 A | 11/2010 |
| CN | 110225575 A | 9/2019 |
| WO | 2018111844 A1 | 6/2018 |
| WO | 2018175002 A1 | 9/2018 |
| WO | 2019074854 A1 | 4/2019 |
| WO | 2019094139 A1 | 5/2019 |

OTHER PUBLICATIONS

Supplementary European Search Report—EP21760642—Search Authority—Munich—Mar. 1, 2024.

(Continued)

*Primary Examiner* — Hsinchun Liao
(74) *Attorney, Agent, or Firm* — ArentFox Schiff LLP

(57) ABSTRACT

Aspects described herein relate to detecting maximum permissible exposure (MPE) events and/or reporting the MPE event, related metrics, associated requests for beam switching or new time division duplexing (TDD) patterns, etc. In an aspect, a MPE event can be detected on at least one component carrier (CC) of multiple CCs configured with a first cell in inter-band carrier aggregation (CA), and one of a MPE report or a beam switching request can be transmitted to a second cell on a different CC of the multiple CCs. In another aspect, the cell can detect the MPE and can transmit, to the device, a beam switching command to switch to a new beam for uplink communications. In another aspect, the cell can transmitting, to another cell having another CC of the multiple CCs configured with the device, an indication to perform beam switching for the device.

18 Claims, 8 Drawing Sheets

(56) References Cited

U.S. PATENT DOCUMENTS

| | | |
|---|---|---|
| 2018/0167897 A1 | 6/2018 | Sampath et al. |
| 2019/0141692 A1 | 5/2019 | Subramanian et al. |
| 2019/0200337 A1* | 6/2019 | Zhou ................... H04L 5/0055 |
| 2019/0261289 A1 | 8/2019 | Raghavan et al. |
| 2019/0313393 A1 | 10/2019 | Wang et al. |
| 2020/0021421 A1 | 1/2020 | Han et al. |

OTHER PUBLICATIONS

ZTE: "Enhancements on Multi-beam Operation", 3GPP TSG RAN WG1 Meeting #96, R1-1901635, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051599332, 18 pages, section 2.2.3; p. 9, sections 2.1.3, p. 6-p. 7.

ZTE: "Enhancement on FR2 MPE Mitigation", 3GPP Draft, 3GPP TSG RAN WG4 Meeting #93, R4-1913920, Reno, US, Nov. 18-22, 2019, 4 Pages.

International Search Report and Written Opinion—PCT/CN2020/076622—ISA/EPO—Nov. 16, 2020.

International Search Report and Written Opinion—PCT/CN2021/076690—ISA/EPO—May 17, 2021.

Nokia, et al., "UE FR2 MPE Enhancements and Solutions", R4-1914274, 3GPP TSG RAN WG4 Meeting #93, Nov. 22, 2019 (Nov. 22, 2019), 7 Pages, p. 2, Sections 2-3.

ZTE: "Enhancement on FR2 MPE Mitigation", 3GPP TSG RAN WG1 Meeting #99, R1-1911943, Reno, US, Nov. 18-22, 2019, 3 Pages, Nov. 18, 2019 (Nov. 18, 2019) The Whole Document.

\* cited by examiner

TECHNIQUES FOR MODIFYING UPLINK COMMUNICATIONS TO AVOID MAXIMUM PERMISSIBLE EXPOSURE (MPE) IN WIRELESS COMMUNICATIONS

CLAIM OF PRIORITY

The present application is a 35 U.S.C. § 371 National Phase of International Patent Application No. PCT/CN2021/076690, entitled "TECHNIQUES FOR MODIFYING UPLINK COMMUNICATIONS TO AVOID MAXIMUM PERMISSIBLE EXPOSURE (MPE) IN WIRELESS COMMUNICATIONS" filed Feb. 18, 2021, which claims priority to PCT Patent Application No. PCT/CN2020/076622, entitled "TECHNIQUES FOR MODIFYING UPLINK COMMUNICATIONS TO AVOID MAXIMUM PERMISSIBLE EXPOSURE (MPE) IN WIRELESS COMMUNICATIONS" filed Feb. 25, 2020, both of which are assigned to the assignee hereof and hereby expressly incorporated by reference herein for all purposes.

BACKGROUND

Aspects of the present disclosure relate generally to wireless communication systems, and more particularly, to maximum permissible exposure (MPE) compliance.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Wireless communication devices, such as user equipment (UEs), can be mandated to comply with maximum permissible exposure (MPE) to prevent exposure of radio waves to human bodies. The devices can accordingly detect MPE events where the device is close to a human body and can apply a power reduction to prevent harm caused by strong radio signals. The devices can transmit signals in certain transmission opportunities for detecting MPE, and can measure signal energy received when transmitting the signals. Where the received signal energy or other characteristics achieve a threshold, the devices can detect the MPE event and can modify transmission parameters, such as applying the power reduction, to mitigate MPE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes detecting a maximum permissible exposure (MPE) event on at least one component carrier (CC) of multiple CCs configured with a first cell in inter-band carrier aggregation (CA), and transmitting, based on detecting the MPE event, one of a MPE report or a beam switching request to a second cell on a different CC of the multiple CCs.

In another aspect, a method for wireless communication is provided. The method includes determining a MPE event on at least one CC of multiple CCs configured with a device in inter-band CA, and transmitting, to the device and based on detecting the MPE event, a beam switching command to switch to a new beam for uplink communications.

In another aspect, a method of wireless communication is provided. The method includes determining a MPE event on at least one CC of multiple CCs configured with a device in inter-band CA, and transmitting, to another cell having another one of the multiple CCs configured with the device, an indication to perform beam switching for the device.

In another aspect, an apparatus for wireless communication is provided that includes a transceiver, a memory configured to store instructions, and one or more processors communicatively coupled with the memory and the transceiver. The one or more processors are configured to detect a MPE event on at least one CC of multiple CCs configured with a first cell in inter-band CA, and transmit, based on detecting the MPE event, one of a MPE report or a beam switching request to a second cell on a different CC of the multiple CCs.

In another aspect, an apparatus for wireless communication is provided that includes a transceiver, a memory configured to store instructions, and one or more processors communicatively coupled with the memory and the transceiver. The one or more processors are configured to determine a MPE event on at least one CC of multiple CCs configured with a device in inter-band CA, and transmit, to the device and based on detecting the MPE event, a beam switching command to switch to a new beam for uplink communications.

In another aspect, an apparatus for wireless communication is provided that includes a transceiver, a memory configured to store instructions, and one or more processors communicatively coupled with the memory and the transceiver. The one or more processors are configured to determine a MPE event on at least one CC of multiple CCs configured with a device in inter-band CA, and transmit, to another cell having another one of the multiple CCs configured with the device, an indication to perform beam switching for the device.

In another aspect, an apparatus for wireless communication is provided that includes means for detecting a MPE event on at least one CC of multiple CCs configured with a first cell in inter-band CA, and means for transmitting, based on detecting the MPE event, one of a MPE report or a beam switching request to a second cell on a different CC of the multiple CCs.

In another aspect, an apparatus for wireless communication is provided that includes means for determining a MPE event on at least one CC of multiple CCs configured with a device in inter-band CA, and means for transmitting, to the device and based on detecting the MPE event, a beam switching command to switch to a new beam for uplink communications.

In another aspect, an apparatus for wireless communication is provided that includes means for determining a MPE event on at least one CC of multiple CCs configured with a device in inter-band CA, and means for transmitting, to another cell having another one of the multiple CCs configured with the device, an indication to perform beam switching for the device.

In another aspect, a computer-readable medium including code executable by one or more processors for wireless communications is provided. The code includes code for detecting a MPE event on at least one CC of multiple CCs configured with a first cell in inter-band CA, and transmitting, based on detecting the MPE event, one of a MPE report or a beam switching request to a second cell on a different CC of the multiple CCs.

In another aspect, a computer-readable medium including code executable by one or more processors for wireless communications is provided. The code includes code for determining a MPE event on at least one CC of multiple CCs configured with a device in inter-band CA, and transmitting, to the device and based on detecting the MPE event, a beam switching command to switch to a new beam for uplink communications.

In another aspect, a computer-readable medium including code executable by one or more processors for wireless communications is provided. The code includes code for determining a MPE event on at least one CC of multiple CCs configured with a device in inter-band CA, and transmitting, to another cell having another one of the multiple CCs configured with the device, an indication to perform beam switching for the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
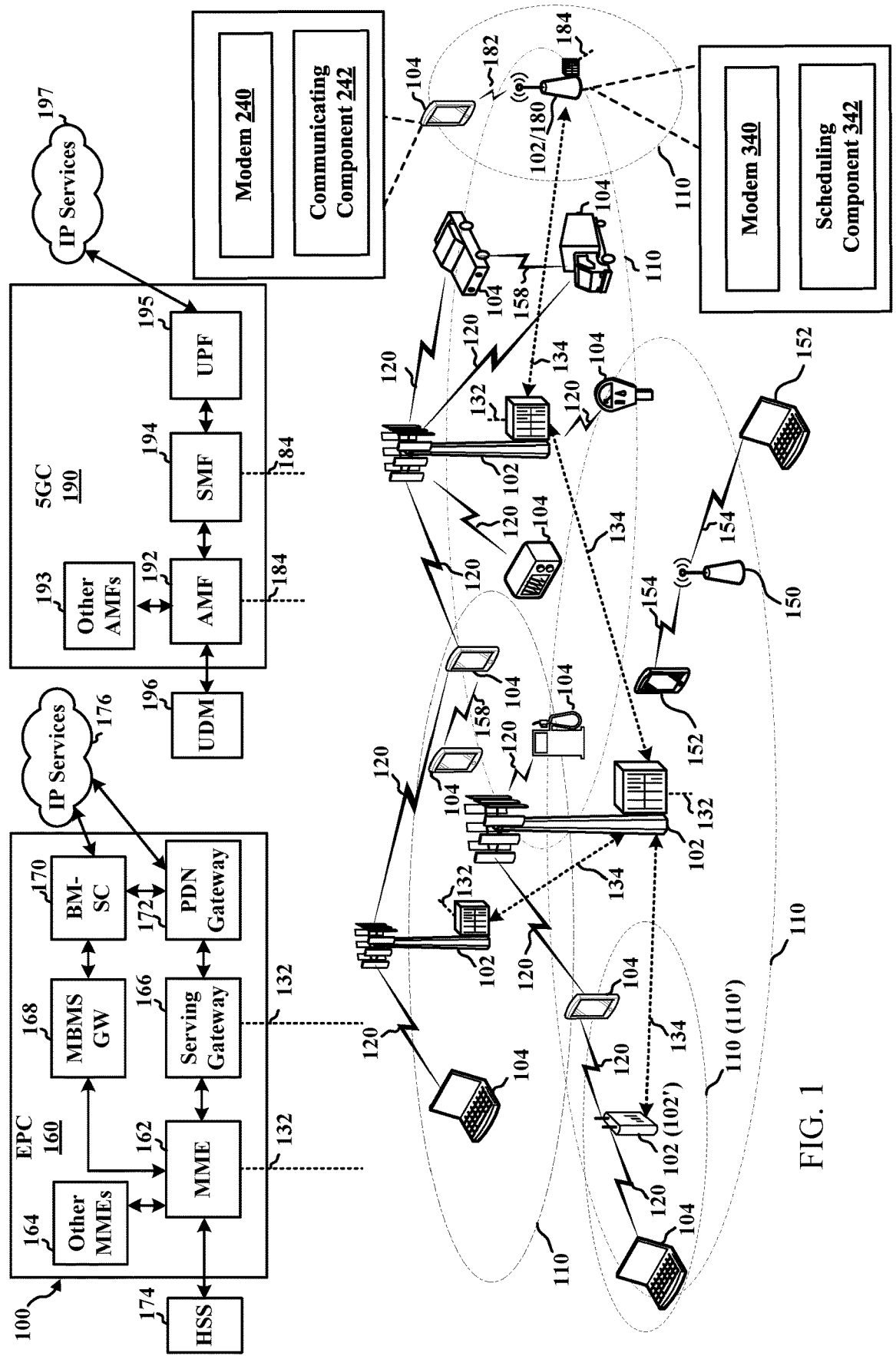
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to maximum permissible exposure (MPE) compliance when multiple component carriers (CCs) are configured for a device (e.g., a user equipment (UE)). For example, the multiple CCs can be configured in inter-band carrier aggregation (CA) where the device can transmit over each of the multiple CCs with one or more cells to improve wireless communication throughput, reliability, diversity, etc. In one specific example, the CCs can correspond to different bandwidths (e.g., one CC at 28 gigahertz (GHz) and one CC at 39 GHz, or one CC at 28 GHz and one CC at 60 GHz, etc.). In any case, the device can consider multiple (e.g., all) configured CCs in determining MPE and/or attempting to modify communications to avoid or remediate MPE.

Aspects described herein relate to adjusting uplink communications over one or more CCs to avoid or remediate MPE. For example, uplink beam switching can be performed to switch an uplink beam used by the UE in transmitting uplink communications to one or more cells such to avoid using a beam that may cause a MPE event. In this example, an uplink beam switching request can be sent on a different CC than a CC on which communications are causing, or potentially cause, MPE, which can increase likelihood that the request is received during MPE on the other CC. In another example, a slot format used in communicating with one or more cells can be modified to remove or decrease uplink transmission opportunities with the one or more cells in the slot such to avoid or remediate an MPE event.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for detecting and/or reporting information related to a MPE event when inter-band CA is configured, in accordance with aspects described herein. In addition, some nodes may have a modem 340 and scheduling component 342 for configuring and/or communicating using inter-band CA, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can detect a MPE event based on multiple CCs configured in inter-band CA and can transmit one or more of a MPE report or an associated request, which may include a beam switching request or a request for a new time division duplexing (TDD) pattern, to the base station 102, as described further herein. Scheduling component 342 can receive the MPE report or associated request and can modify uplink communications to avoid or remediate the MPE. For example, scheduling component 342 can transmit a beam switching command, a new TDD pattern, and/or the like to the UE 104. In another example, scheduling component 342 can transmit an indication to another base station 102 providing another one of the cells in CA to perform the beam switching with the UE 104. In any case, uplink communications can be modified based on detecting MPE to avoid or remediate the MPE.

Figure 2:
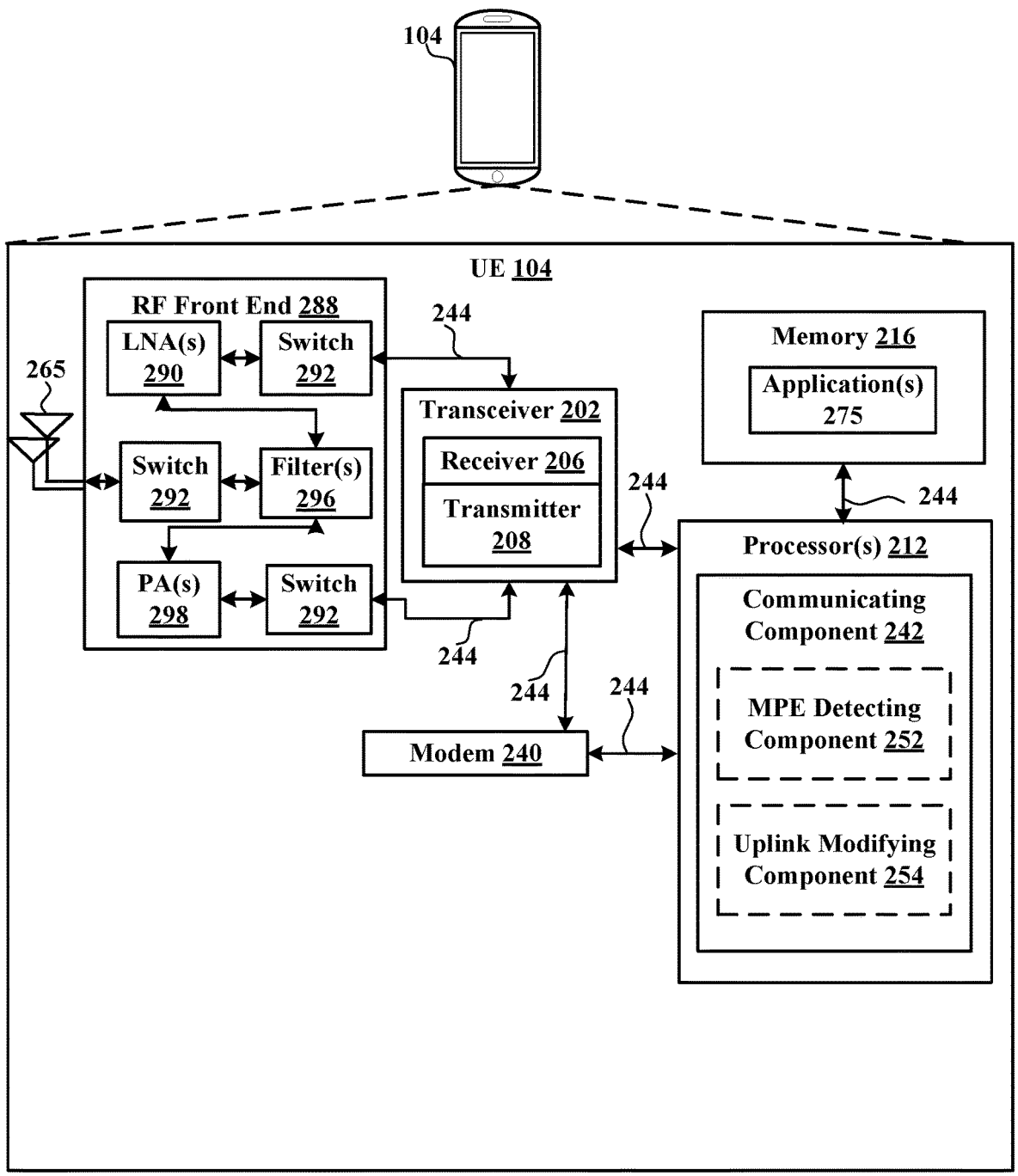
FIG. 2 is a block diagram illustrating an example of a UE, in accordance with various aspects of the present disclosure.
Figure 3:
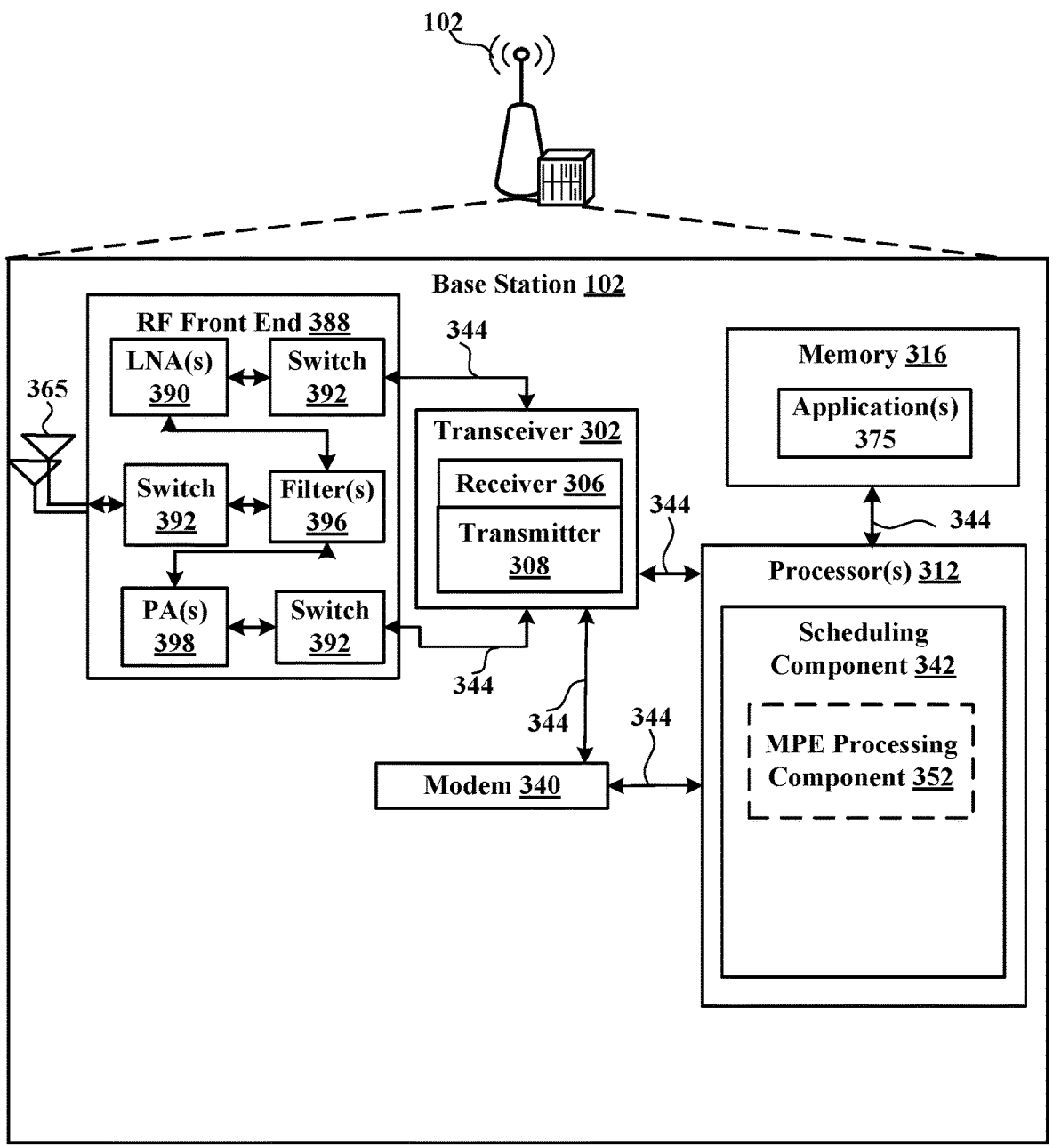
FIG. 3 is a block diagram illustrating an example of a base station, in accordance with various aspects of the present disclosure.
Figure 4:
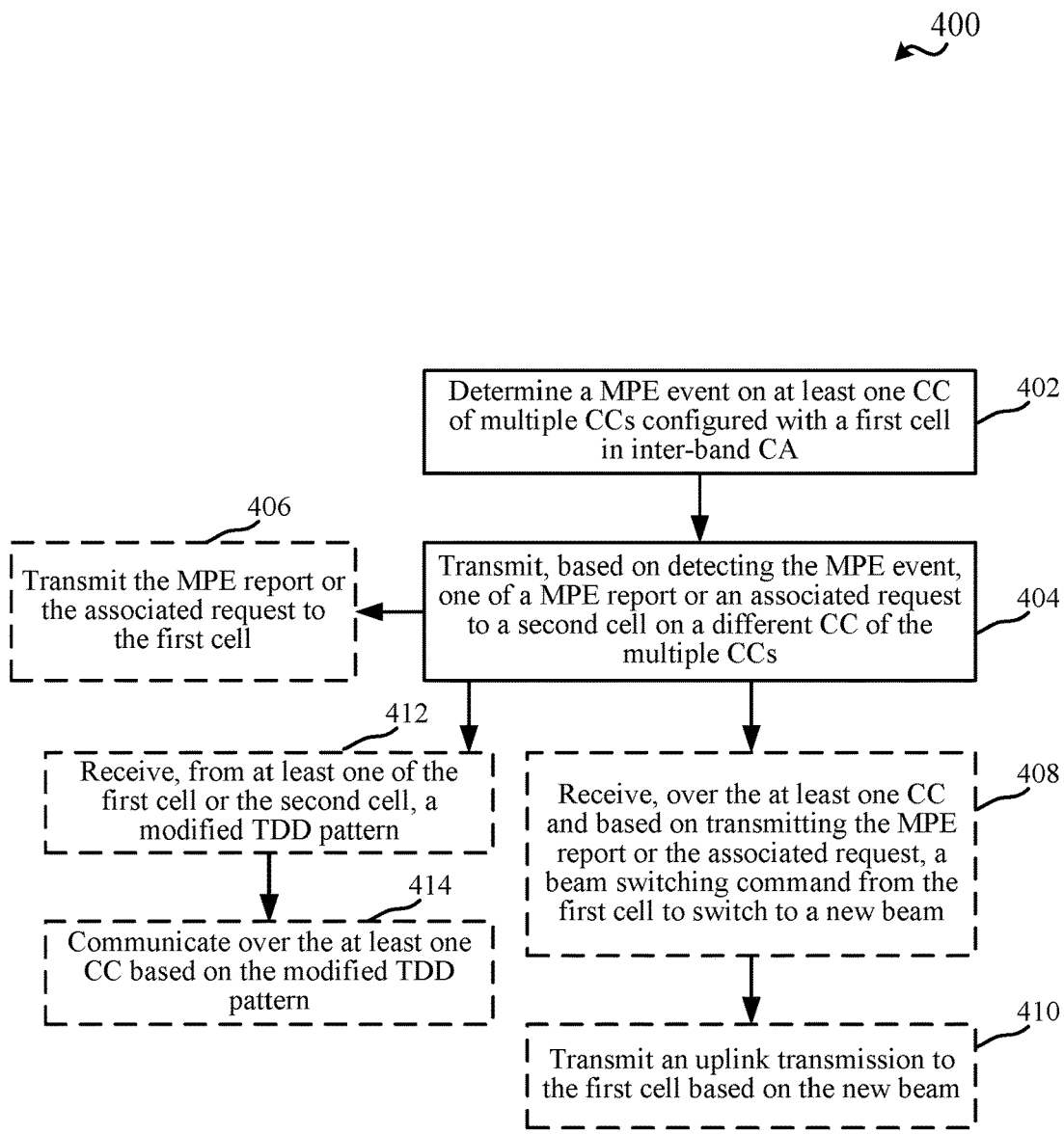
FIG. 4 is a flow chart illustrating an example of a method for reporting parameters related to a maximum permissible exposure (MPE) event, in accordance with various aspects of the present disclosure.
Figure 5:
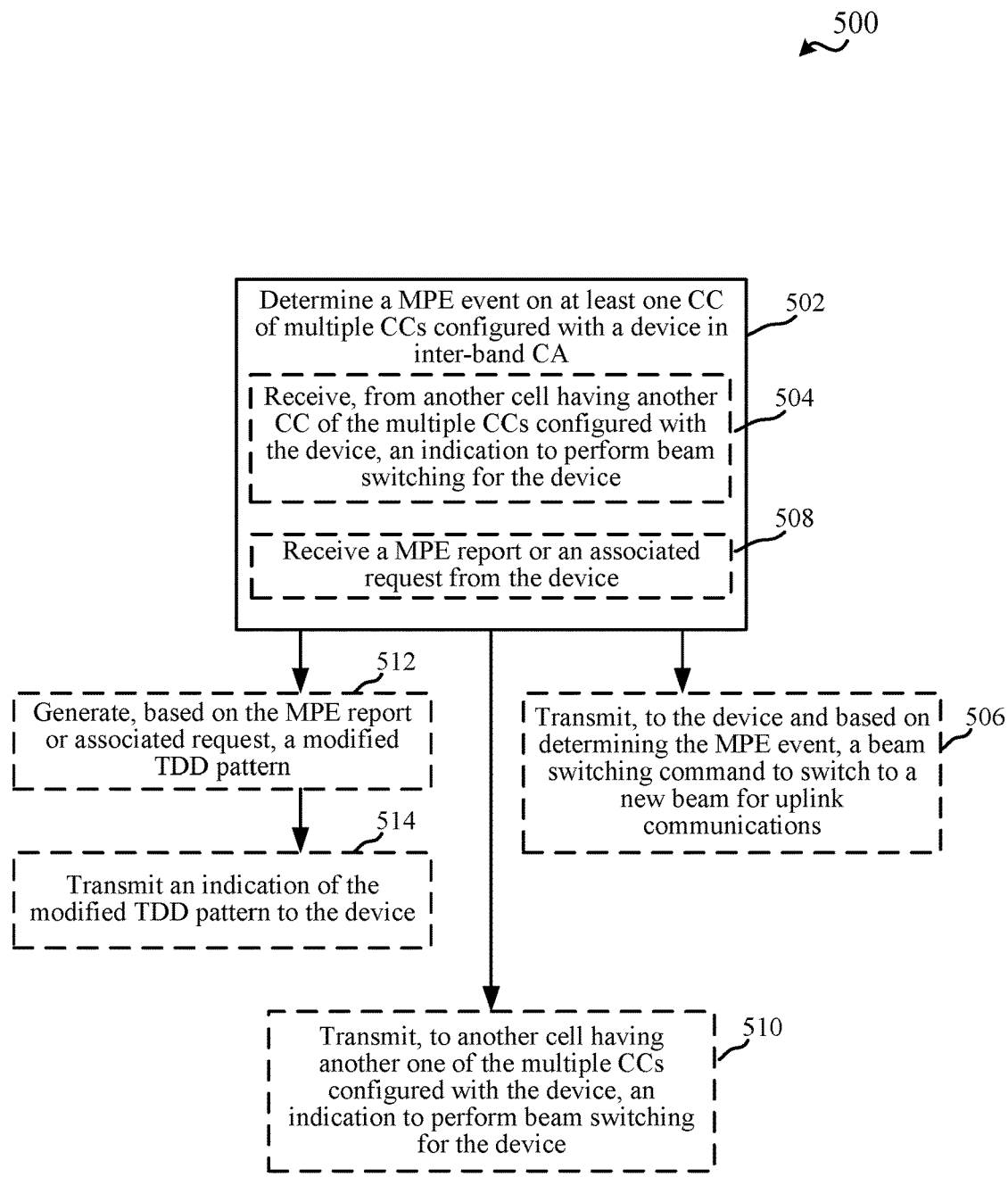
FIG. 5 is a flow chart illustrating an example of a method for receiving a report related to an MPE event, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for detecting and/or reporting information related to a MPE event when inter-band CA is configured, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a MPE detecting component 252 for detecting an MPE event or one or more related parameters at the UE 104 and/or transmitting a MPE report or associated request to one or more base stations, and/or an uplink modifying component 254 for modifying one or more uplink communication parameters based on detecting the MPE, in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring and/or communicating using inter-band CA, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a MPE processing component 352 for receiving parameters related to detecting an MPE and/or reporting parameters or related indication to another base station, in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for detecting and/or reporting information related to an MPE event when configured for inter-band CA. In an example, a UE 104 can perform the functions described in method 400 using one or more of the components described in FIGS. 1 and 2. In inter-band CA, for example, the UE 104 can concurrently communicate with a first cell, which may be in a first frequency band and may have at least one CC, and with a second cell, which may be in the first or a second frequency band and may have at least one CC.

In method 400, at Block 402, a MPE event can be determined on at least one CC of multiple CCs configured with a first cell in inter-band CA. In an aspect, MPE detecting component 252, e.g., in conjunction with processor(s) 212, memory 216, transceiver 202, communicating component 242, etc., can determine the MPE event on at least one CC of the multiple CCs configured with the first cell in inter-band CA. For example, MPE detecting component 252 may determine the MPE event based on one or more beams configured for communicating over the at least one CC of the multiple CCs with the first cell. In an example, MPE detecting component 252 may determine the MPE event, or otherwise to report information regarding an MPE event or other associated requests, based on comparing one or more parameter values related to transmitting uplink communications to one or more thresholds. The one or more parameter values, for example, may be related to transmitting the uplink communications using the one or more beams configured for the at least one CC.

In a specific example, MPE detecting component 252 can determine the MPE event based at least in part on measuring a maximum power reduction (MPR) parameter value configured for one or more of the cells or CCs configured in inter-band CA. For example, each cell can configure a MPR parameter value for the UE 104 to apply a power reduction in various scenarios. An example of a MPR parameter value used in fifth generation (5G) new radio (NR) is defined in third generation partnership project (3GPP) technical specification (TS) 38.101-2, which may include a MPR, additional MPR (A-MPR), power management MPR (P-MPR), etc., as described in sections 6.2A.1, 6.2A.2, 6.2A.3, 6.2.4.

For example, the total configured power $P_{CMAX}$ in a transmission occasion can be the sum of the configured power for carrier f of serving cell c with non-zero granted transmission power in the respective reference point. The total configured UE maximum output power PCMAX, as defined for 5G NR, can be set such that the corresponding measured total peak effective isotropic radiated power (EIRP) PUMAX is within the following bounds $$PPowerclass - MAX(MAX(MPR, A\_MPR), P-MPR) - MAX\{T(MAX(MPR, A\_MPR)), T(P-MPR)\} \leq PUMAX \leq EIRPmax$$

where PPowerclass represents the UE power class as specified in sub-clause 6.2A.1, EIRPmax represents the applicable maximum EIRP as specified in sub-clause 6.2A.1, MPR is as specified in sub-clause 6.2A.2, A-MPR as specified in sub-clause 6.2A.3, P-MPR the power management term for the UE as described in 6.2.4 and TRPmax represents the maximum total radiated power (TRP) for the UE power class as specified in sub-clause 6.2A.1. PUMAX is defined as 10*log 10($\Sigma$pUMAX,fli),c(j)) for each carrier f (i=1 . . . n) and serving cell c (j=1 . . . m) where pUMAX, fli),c(j) is linear value of PUMAX,fli),c(j). In an example, MPE detecting component 252 can determine MPE where P-MPR for a cell achieves a threshold.

In method 400, at Block 404, one of a MPE report or an associated request can be transmitted to a second cell on a different CC of the multiple CCs. In an aspect, MPE detecting component 252, e.g., in conjunction with processor(s) 212, memory 216, transceiver 202, communicating component 242, etc., can transmit, based on detecting the MPE event, one of the MPE report or the associated request to the second cell on the different CC of the multiple CCs. This can improve the likelihood that a base station can receive and process the MPE report or associated request. For example, as described further herein, based on the MPE report or other request, the base station 102 can transmit a beam switching command, a new TDD pattern, etc. to the UE 104 to modify uplink communications therewith. For example, MPE detecting component 252 can transmit the MPE report, an uplink beam switching request, a new TDD pattern request, etc. to the base station 102 over a media access control (MAC) control element (CE), a physical uplink control channel (PUCCH) transmission, layer 3 (L3) reporting, etc.

For example, MPE detecting component 252 can transmit the MPE report or beam switching request with one or more parameters corresponding to the cell, CC, beam, etc. for which the MPE is detected. For example, MPE detecting component 252 can transmit the MPE report or beam switching request including, for example, at least one band identifier (e.g., from FrequencyInfoUL), cell identifier(s), bandwidth part (BWP) identifier(s) of a BWP used for the CC, old uplink beam identifier(s), new uplink beam identifiers(s) (e.g., requested to be used in communicating with the cell over the CC), etc. For example, the new uplink beam identifier(s) can be requested to replace the old uplink beam identifier(s). In an example, a band identifier may indicate a group of cells (e.g., more than one cell) in the frequency band. By default, in one example, all the cells on the frequency band may be reported. In addition, for example, MPE detecting component 252 can transmit the request on cells of the live band or both the bands (e.g., from FrequencyInfoUL). The live band, as referred to herein, is a frequency band or a corresponding CC having less impact due to the MPE (e.g., a frequency band or CC with the second cell in this example).

In this example, in method 400, optionally at Block 406, the MPE report or the associated request can be transmitted to the first cell. In an aspect, MPE detecting component 252, e.g., in conjunction with processor(s) 212, memory 216, transceiver 202, communicating component 242, etc., can transmit the MPE report or the associated request to the first cell as well. For example, transmitting the MPE report to the first cell can refer to transmitting the MPE report to a base station that provides the first cell, transmitting the MPE report over a CC configured in the cell, etc. In one specific example, MPE detecting component 252 can transmit MPE report at carrier $f_i$ of cell $c_j$, and can transmit the beam switching request on either or both carrier $f_n$ of cell $c_m$ and carrier $f_i$ of cell $c_j$.

In method 400, optionally at Block 408, a beam switching command from the first cell to switch to a new beam can be received over the at least one CC and based on transmitting the MPE report or the associated request. In an aspect, uplink modifying component 254, e.g., in conjunction with processor(s) 212, memory 216, transceiver 202, communicating component 242, etc., can receive, over the at least one CC of the multiple CCs and based on transmitting the MPE report or the associated request, the beam switching command from the first cell to switch to the new beam. For example, the new beam may have different spatial properties (e.g., different spatial direction) than a beam used in previously communicating with the first cell, and may accordingly not cause or be subject to the MPE event. In addition, in one example described above, the MPE report transmitted at Block 404 can relate to multiple cells and/or CCs, and can be transmitted (e.g., by the second cell) to additional cells. Accordingly, in an example, receiving the beam switching command at Block 408 may include receiving beam switching commands from or related to multiple cells.

In method 400, optionally at Block 410, an uplink transmission can be transmitted to the first cell based on the new beam. In an aspect, communicating component 242, e.g., in conjunction with processor(s) 212, memory 216, transceiver 202, etc., can transmit the uplink transmission to the first cell based on the new beam. For example, communicating component 242 can generate the new beam for subsequent uplink communications. Generating the new beam, for example, may include selectively applying power to or activating different antenna module(s) or resources of the UE 104 to achieve the different spatial direction. For example, the beams can be configured at the UE 104, and the beam switching command received at Block 406 may include an identifier of a configured beam. In addition, for example, where multiple beam switching commands are received at Block 408, communicating component 242 can transmit uplink communications to multiple cells using multiple new beams. In any case, for example, communicating component 242 can generate the new beam based on determining the identifier and related parameters for powering, activating, or otherwise using antenna modules or other antenna resources of the UE 104 to generate the new beam. In another example, the beam switching command may include parameters related to generating the beam, such as an indication of antenna modules or resources to power, activate, etc., an indication of a directionality for the beam, etc. A specific example is shown in FIG. 6.

Figure 6:
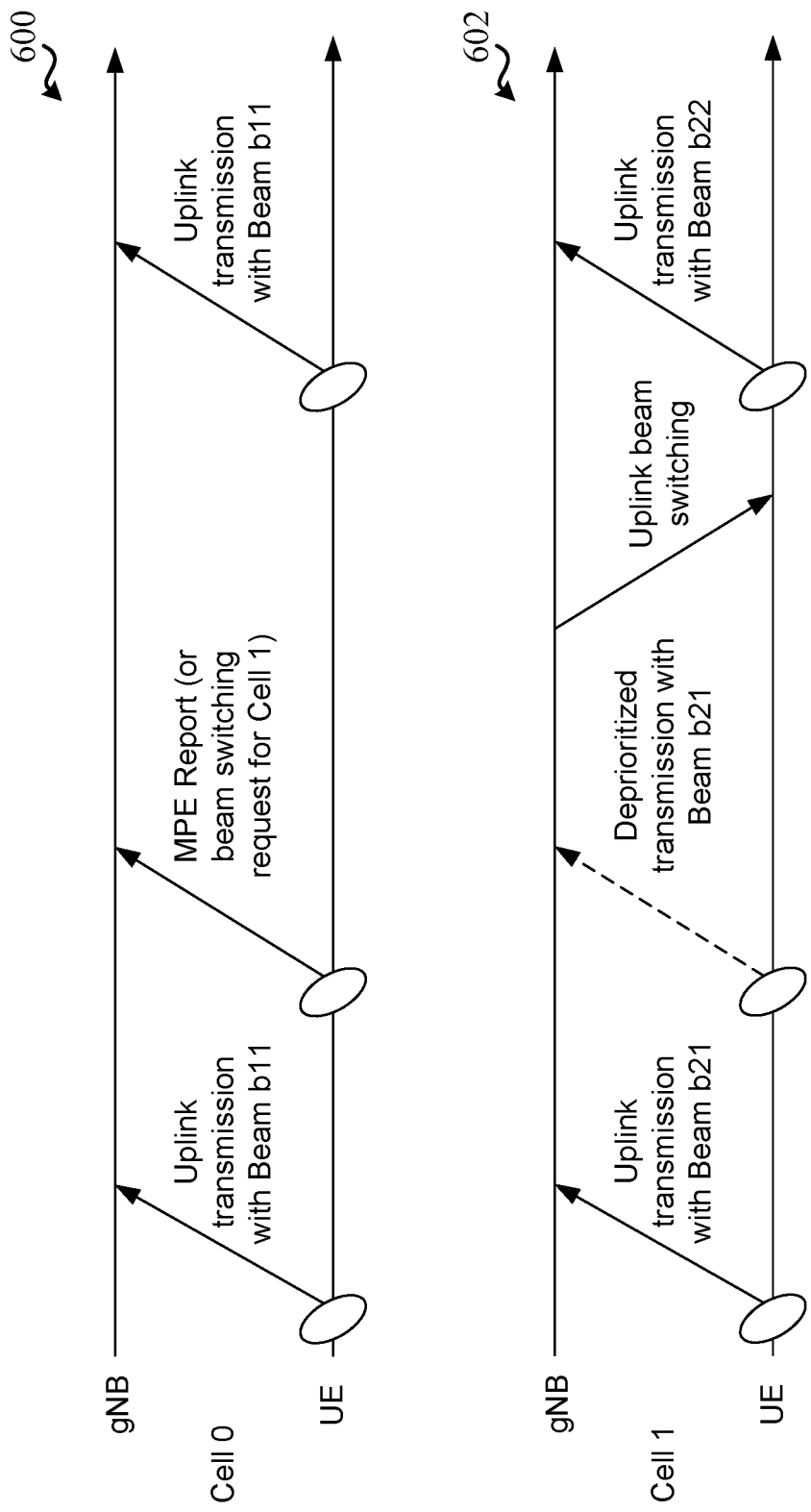
FIG. 6 illustrates examples of communication timelines for reporting MPE event information, in accordance with various aspects of the present disclosure.

FIG. 6 illustrates an example of a communication timeline 600 for communicating with a gNB in cell 0, and a communication timeline 602 for communicating with a gNB in cell 1 using inter-band CA. For example, the UE in timelines 600 and 602 can be the same UE, but the gNBs may be the same or different gNBs that provide different cells. In one specific example, cell 0 can be in one frequency band, and cell 1 can be in another frequency band. In communication timeline 600, the UE can transmit an uplink transmission with beam b11 to the gNB in cell 0, and can also transmit, in a similar occasion or time period, an uplink transmission with beam b21 to the gNB in cell 1. For example, occasions or time periods for transmitting communications, as described herein, can include an orthogonal frequency division multiplexing (OFDM) symbol, a single-carrier frequency division multiplexing (SC-FDM) symbol, a collection of symbols, a slot of multiple symbols, a collection of multiple slots, a transmission time interval (TTI) (which may include one or more symbols or one or more slots of symbols), as defined in a radio access technology, etc. In a subsequent time period, in timeline 602, the UE can determine to deprioritize transmission on beam b21 due to detecting MPE on the beam or with the cell 1, etc.

For example, UE 104 can deprioritize the transmission based on determining a P-MPR configured by cell 1 (or that the P-MPR achieves a threshold). Based on deprioritizing the transmission associated with beam b21 or otherwise determining a MPE event, the UE can transmit a MPE report (or beam switching request) to the gNB in cell 0 in the same or subsequent time period. Transmitting the MPE report (or beam switching request) to the gNB in cell 0 can improve the likelihood that the network receives the report and/or request where the uplink transmissions for cell 0 are not deprioritized. As described, for example, the UE can determine to transmit the MPE report (or beam switching request) to the gNB in cell 0 based on determining that the MPE (or P-MPR above a threshold) corresponds to the other cell (cell 1). The gNB in cell 0 can receive the MPE report (or beam switching request) and can accordingly notify the gNB of cell 1 of MPE at the UE and/or related information. The gNB of cell 1 can transmit an uplink beam switching command to the UE to switch the uplink beam in communicating with cell 1 to beam b22. In a subsequent time period, the UE can transmit an uplink transmission with beam b22 to the gNB in cell 1, and/or can also transmit, in a similar occasion or time period, an uplink transmission with beam b11 to the gNB in cell 0.

In another example, where transmitting the associated request at Block 404 includes transmitting a request for a new TDD pattern, in method 400, optionally at Block 412, a modified TDD pattern can be received from at least one of the first cell or the second cell. In an aspect, uplink modifying component 254, e.g., in conjunction with processor(s) 212, memory 216, transceiver 202, communicating component 242, etc., can receive, from at least one of the first cell or the second cell, the modified TDD pattern. For example, the modified TDD pattern can decrease or remove a number of time periods allocated for uplink communications for the first cell. In an example, the modified TDD pattern may additionally or alternatively increase a number of time periods allocated for uplink communications for the second cell or other cells not having the MPE event.

In a specific example, MPE detecting component 252 can transmit the TDD pattern change request on MAC-CE or PUCCH. In addition, the TDD pattern change request may include a target frequency band identifier, a target cell identifier (e.g., of the cell on which communications are causing the MPE event), a desired target TDD pattern, etc. In addition, in an example, uplink modifying component 254 can receive the modified TDD pattern from the first cell or second cell (e.g., from associated base station(s)) in downlink control information (DCI)-based slot format indicator (SFI) indication. The modified TDD pattern may be indicated for multiple cells in a target frequency band. For example, as described above an further herein, the TDD pattern may be defined such that cells with better MPE condition can be allocated with more uplink symbols.

In this example, in method 400, optionally at Block 414, the at least one CC can be communicated over based on the modified TDD pattern. In an aspect, communicating component 242, e.g., in conjunction with processor(s) 212, memory 216, transceiver 202, etc., can communicate over the at least one CC of the multiple CCs based on the modified TDD pattern. For example, using TDD patterns that remove some uplink transmission occasions for cell 1 can assist in avoiding or remediating the MPE event in communications with cell 1. In one example, modifying the TDD pattern may be used in conjunction with, or alternatively to, beam switching (e.g., or where beam switching is not successful), etc. An example is shown in FIG. 7.

Figure 7:
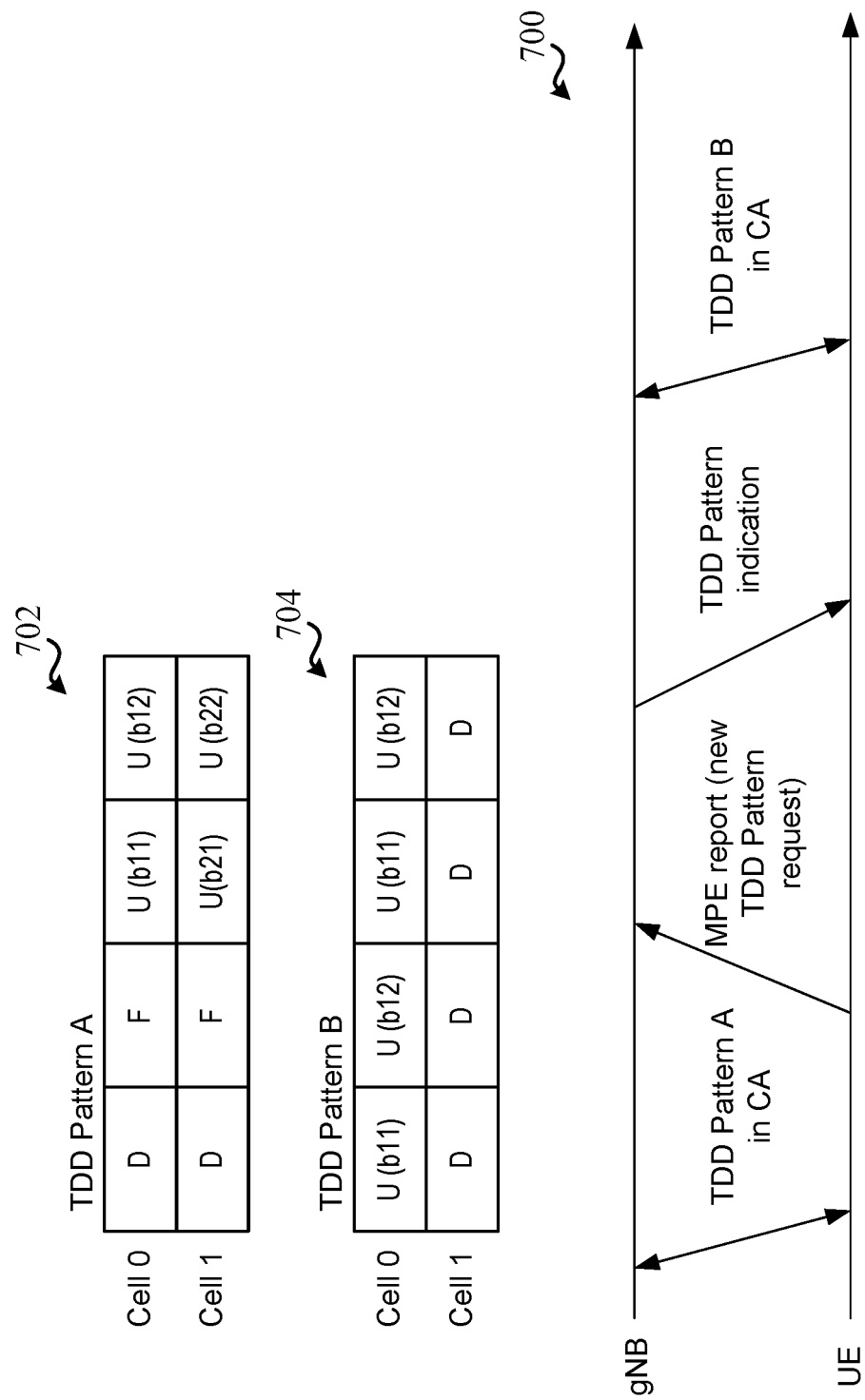
FIG. 7 illustrates an example of a communication timeline and corresponding time division duplexing (TDD) patterns, in accordance with various aspects of the present disclosure.

FIG. 7 illustrates an example of a communication timeline 700 of communications between gNBs and a UE, as well as TDD patterns 702 and 704 configured for the UE to use in communicating with the gNBs. In communication timeline 700, gNBs and UE can communicate according to TDD pattern A 702, which defines a pattern for cell 0 and cell 1 in inter-band CA, where both cells are configured for communications in a set of symbols according to the following pattern: downlink symbol, flexible symbol, uplink symbol, uplink symbol. The UE can transmit a MPE report and/or request for a new TDD pattern in timeline 700, which can be based on detecting a MPE event with cell 1 and/or on a related CC and/or beam. As described, in an example, the UE can transmit the MPE report and/or request for new TDD pattern to one or more of the gNBs. One or more gNBs can configure, based on receiving the report and/or request, a new TDD pattern, which can include TDD pattern B 704, which defines a pattern for cell 0 of symbols according to the following pattern: uplink symbol, uplink symbol, uplink symbol, uplink symbol, and for cell 1 according to the following pattern: downlink symbol, downlink symbol, downlink symbol, downlink symbol. In this regard, the MPE event can be avoided or remediated based on the UE being only configured for downlink symbols with cell 1. In addition, in this example, the removal of uplink symbols in the pattern for cell 1 can be addressed by providing the additional uplink symbols in the pattern for cell 0.

FIG. 5 illustrates a flow chart of an example of a method 500 for receiving an MPE report or associated request, in accordance with aspects described herein. In an example, a base station 102 can perform the functions described in method 500 using one or more of the components described in FIGS. 1 and 3.

In method 500, at Block 502, an MPE event on at least one CC of multiple CCs configured with a device in inter-band CA can be determined. In an aspect, MPE processing component 352, e.g., in conjunction with processor(s) 312, memory 316, transceiver 302, scheduling component 342, etc., can determine the MPE event on the at least one CC of the multiple CCs configured with the device in inter-band CA. For example, MPE processing component 352 can receive an indication of occurrence of the MPE event, one or more metrics from which MPE processing component 352 can detect occurrence of the event (such as a P-MPR configured for the device, power class of the device, TRP of the device, etc.), and/or the like. Moreover, for example, MPE processing component 352 can receive the indication or other metrics from the device, from another base station or cell, etc.

In determining the MPE event at Block 502, optionally at Block 504, an indication to perform beam switching for the device can be received from another cell having another CC of the multiple CCs configured with the device. In an aspect, MPE processing component 352, e.g., in conjunction with processor(s) 312, memory 316, transceiver 302, scheduling component 342, etc., can receive, from another cell having another CC of the multiple CCs configured with the device, the indication to perform beam switching for the device. For example, MPE processing component 352 can receive the indication from another cell over a backhaul link. For example, the device may not be experiencing MPE event with the another cell, and thus this cell can communicate the indication to the cell of base station 102, so that the device does not have to violate MPE to transmit the indication to the cell of base station 102.

In this example, in method 500, optionally at Block 506, a beam switching command to switch to a new beam for uplink communications can be transmitted to the device based on determining the MPE event. In an aspect, scheduling component 342, e.g., in conjunction with processor(s) 312, memory 316, transceiver 302, etc., can transmit, to the device and based on determining the MPE event, the beam switching command to switch to the new beam for uplink communications. For example, MPE processing component 352 can determine the new beam that has different spatial parameters than a current or previous beam, as described, so that the UE 104 can use the new beam to avoid or remediate the MPE event.

In one example, MPE processing component 352 can determine the new beam based on parameters indicated in an MPE report or beam switching request that was transmitted the another cell and provided to the cell of base station 102. For example, the one or more parameters may include a band identifier (e.g., from FrequencyInfoUL), cell identifier(s), bandwidth part (BWP) identifier(s) of a BWP used for the CC, old uplink beam identifier(s), new uplink beam identifiers(s) (e.g., requested to be used in communicating with the cell over the CC), etc. For example, MPE processing component 352 can at least one of determine the new beam for one or more cells using the frequency band or BWP, determine the new beam based on indicated new beam identifiers, etc. In any case, scheduling component 342 can transmit the beam switching command to the device.

In another example, in determining the MPE event at Block 502, optionally at Block 508, a MPE report or an associated request can be received from the device. In an aspect, MPE processing component 352, e.g., in conjunction with processor(s) 312, memory 316, transceiver 302, scheduling component 342, etc., can receive the MPE report or the associated request from the device. For example, the request can include a beam switching request, a request for a new TDD pattern, etc. For example, the MPE report and/or associated request may include one or more parameters based on which a cell, frequency band, beam, etc. related to the MPE can be determined. MPE processing component 352 can use this information to determine another cell to which to transmit or forward the MPE report, associated request, indication to switch beams, etc. For example, scheduling component 342 can know which cells are providing which bands, BWPs, etc. and MPE processing component 352 can determine to transmit the MPE report, associated request, etc. to the cells providing a band, BWP, etc. related to the MPE event.

In this example, in method 500, optionally at Block 510, an indication to perform beam switching for the device can be transmitted to another cell having another one of the multiple CCs configured with the device. In an aspect, MPE processing component 352, e.g., in conjunction with processor(s) 312, memory 316, transceiver 302, scheduling component 342, etc., can transmit, to another cell having another one of the multiple CCs configured with the device, the indication to perform beam switching for the device. For example, MPE processing component 352 can transmit the indication over a backhaul link to the another cell. The indication may include the MPE report, the associated request, or other corresponding parameters, such to cause the another cell to perform beam switching with the device, as described above. In one example, in determining the MPE event at Block 502, multiple cells to which the MPE event relates can be determined, and the MPE processing component 352 can accordingly transmit the indication to one or more other cells (e.g., the cells identified from the MPE report as relating to the MPE event).

In another example, receiving the MPE report or associated request at Block 508 can include receiving a request for a new TDD pattern. In this example, in method 500, optionally at Block 512, a modified TDD pattern can be generated based on the MPE report or associated request. In an aspect, MPE processing component 352, e.g., in conjunction with processor(s) 312, memory 316, transceiver 302, scheduling component 342, etc., can generate, based on the MPE report or associated request, the modified TDD pattern. For example, as described, MPE processing component 352 can generate the modified TDD pattern to decrease or remove uplink symbols for a cell related to the MPE event and/or to increase uplink symbols with other cells. Moreover, for example, the MPE report or associated request may include a target cell identifier that identifies a cell for which a new TDD pattern is desired (e.g., a cell related to the MPE event). For example, the cell related to the MPE event can include a cell having uplink communications configured in a CC and/or using a beam that may be causing a detected or potential MPE event, as described above. In this example, MPE processing component 352 can generate the modified TDD pattern at least for the identified cell. In yet another example, the MPE report or associated request may include a target frequency band identifier that identifies a frequency band for which a new TDD pattern is desired (e.g., for all cells in the frequency band that are associated with the inter-band CA), and MPE processing component 352 can generate the modified TDD pattern at least for the cells in the identified target frequency band.

In method 500, optionally at Block 514, an indication of the modified TDD pattern can be transmitted to the device. In an aspect, scheduling component 342, e.g., in conjunction with processor(s) 312, memory 316, transceiver 302, etc., can transmit an indication of the modified TDD pattern to the device. In this regard, the device can receive the TDD pattern and can communicate with a cell of base station 102 and/or other cells in inter-band CA based on the new TDD pattern, as described.

Figure 8:
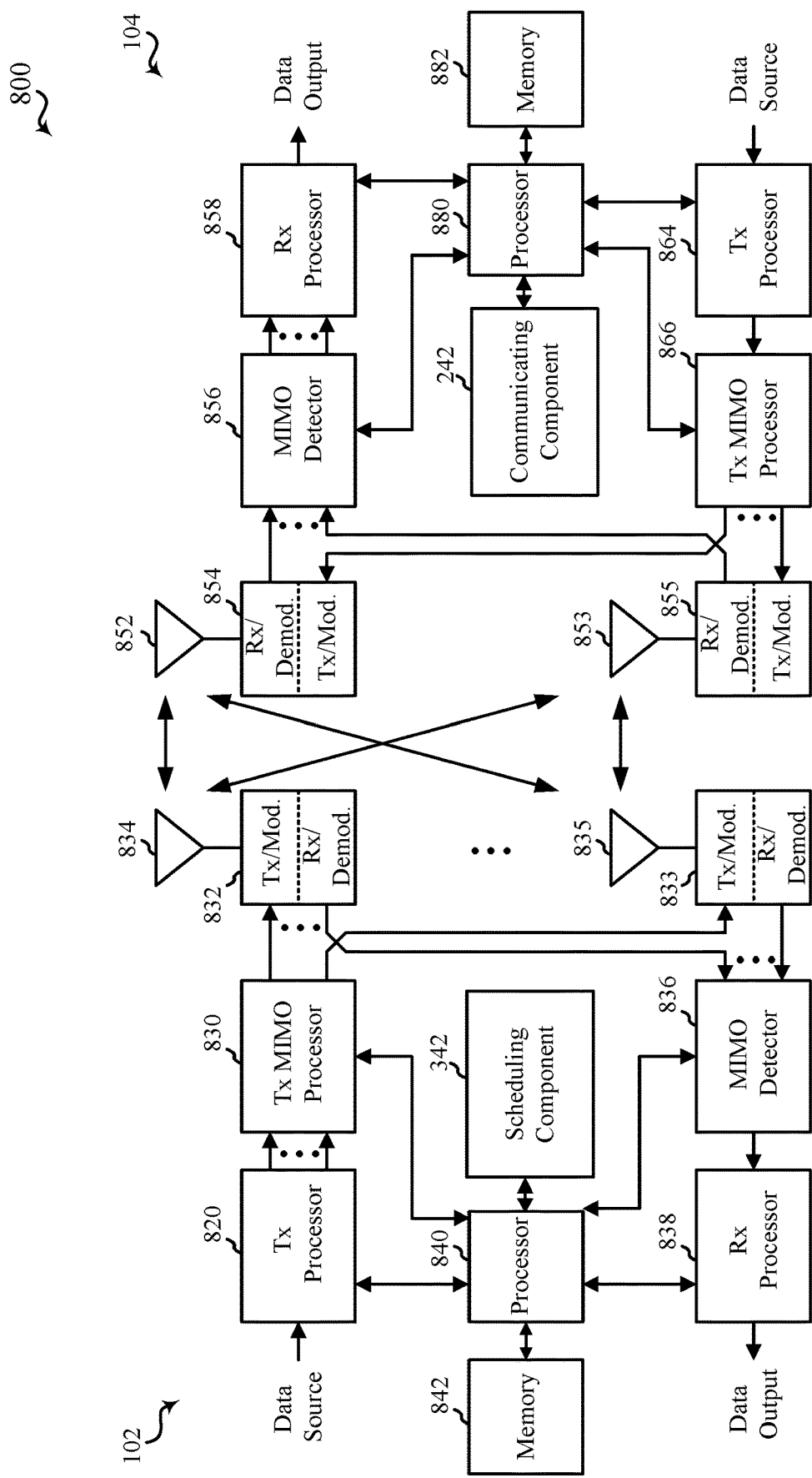
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including detecting a MPE event on at least one of multiple CCs configured with a first cell in inter-band CA, and transmitting, based on detecting the MPE event, one of a MPE report or a beam switching request to a second cell on a different one of the multiple CCs.

In Aspect 2, the method of Aspect 1 includes receiving, over the one of the multiple CCs and based on transmitting the MPE report or the beam switching request, a beam switching command from the first cell to switch to a new beam, and transmitting an uplink transmission to the first cell based on the new beam.

In Aspect 3, the method of any of Aspects 1 or 2 includes wherein the first cell in inter-band CA uses a first frequency band which has at least a first CC, and the second cell in inter-band CA uses the first or a second frequency band which has at least a second CC.

In Aspect 4, the method of any of Aspects 1 to 3 includes wherein the MPE report or the beam switching request indicates a band identifier, at least one cell identifier, at least one bandwidth part identifier, at least one uplink beam identifier of an original uplink beam, or at least one new beam identifier of a new uplink beam.

In Aspect 5, the method of Aspect 4 includes wherein the band identifier identifies multiple cells or CCs on which the MPE event is detected, and further comprising, receiving, over the one of the multiple CCs and based on transmitting the MPE report or the beam switching request, a beam switching command from the first cell or the multiple cells to switch to new beams on the multiple cells or CCs.

In Aspect 6, the method of any of Aspects 1 to 5 includes wherein transmitting the MPE report or the beam switching request includes transmitting the MPE report or the beam switching request on a MAC CE, a PUCCH, or layer 3 reporting.

In Aspect 7, the method of any of Aspects 1 to 6 includes transmitting, based on detecting the MPE event, one of the MPE report or the beam switching request to the first cell on the one of the multiple CCs.

In Aspect 8, the method of any of Aspects 1 to 7 includes transmitting, based on detecting the MPE event, a request to change a TDD pattern of a collection of symbols to at least one of the first cell or the second cell.

In Aspect 9, the method of Aspect 8 includes receiving, from at least one of the first cell or the second cell and in response to the request, a modified TDD pattern for the collection of symbols, and communicating over the one of the multiple CCs based on the modified TDD pattern.

In Aspect 10, the method of any of Aspects 8 or 9 includes wherein the request identifies the first cell as a target cell for the change in TDD pattern.

In Aspect 11, the method of any of Aspects 8 to 10 includes wherein the request indicates the change in TDD pattern.

Aspect 12 is a method for wireless communication including determining a MPE event on one of multiple CCs configured with a device in inter-band CA, and transmitting, to the device and based on detecting the MPE event, a beam switching command to switch to a new beam for uplink communications.

In Aspect 13, the method of Aspect 12 includes wherein determining the MPE event is based at least in part on receiving, from another cell having another one of the multiple CCs configured with the device, an indication to perform beam switching for the device.

In Aspect 14, the method of any of Aspects 12 or 13 includes wherein determining the MPE event includes receiving a MPE report or beam switching request from the device.

In Aspect 15, the method of any of Aspects 12 to 14 includes receiving, from the device, a request to change a TDD pattern of a collection of symbols.

In Aspect 16, the method of Aspect 15 includes generating, based at least in part on the request, a modified TDD pattern for the collection of symbols, and transmitting an indication of the modified TDD pattern to the device.

In Aspect 17, the method of any of Aspects 15 or 16 includes wherein the request identifies a target cell for the change in TDD pattern.

In Aspect 18, the method of any of Aspects 15 to 17 includes wherein the request indicates the change in TDD pattern.

Aspect 19 is a method for wireless communication including determining a MPE event on one of multiple CCs configured with a device in inter-band CA, and transmitting, to another cell having another one of the multiple CCs configured with the device, an indication to perform beam switching for the device.

In Aspect 20, the method of Aspect 19 includes wherein determining the MPE event includes receiving a MPE report or beam switching request from the device.

In Aspect 21, the method of Aspect 20 includes wherein the MPE report or the beam switching request indicates one or more parameters including at least one of a band identifier, at least one cell identifier, at least one bandwidth part identifier, at least one uplink beam identifier of an original uplink beam, or at least one new beam identifier of a new uplink beam, and further comprising determining the another cell based at least in part on the one or more parameters.

In Aspect 22, the method of Aspect 21 includes wherein the band identifier identifies multiple cells or CCs on which the MPE event is detected, and further comprising, transmitting, to the multiple cells, the indication to perform beam switching for the device.

In Aspect 23, the method of any of Aspects 20 to 22 includes wherein receiving the MPE report or the beam switching request includes receiving the MPE report or the beam switching request on a MAC CE, a PUCCH, or layer 3 reporting.

Aspect 24 is an apparatus for wireless communication including a transceiver, a memory configured to store instructions, and one or more processors communicatively coupled with the memory and the transceiver, wherein the one or more processors are configured to detect a MPE event on at least one of multiple CCs configured with a first cell in inter-band CA, and transmit, based on detecting the MPE event, one of a MPE report or a beam switching request to a second cell on a different one of the multiple CCs.

In Aspect 25, the apparatus of Aspect 24 includes wherein the one or more processors are further configured to receive, over the one of the multiple CCs and based on transmitting the MPE report or the beam switching request, a beam switching command from the first cell to switch to a new beam, and transmit an uplink transmission to the first cell based on the new beam.

In Aspect 26, the apparatus of any of Aspects 24 or 25 includes wherein the first cell in inter-band CA uses a first frequency band which has at least a first CC, and the second cell in inter-band CA uses the first or a second frequency band which has at least a second CC.

In Aspect 27, the apparatus of any of Aspects 24 to 26 includes wherein the MPE report or the beam switching request indicates a band identifier, at least one cell identifier, at least one bandwidth part identifier, at least one uplink beam identifier of an original uplink beam, or at least one new beam identifier of a new uplink beam.

M Aspect 28, the apparatus of Aspect 27 includes wherein the band identifier identifies multiple cells or CCs on which the MPE event is detected, and wherein the one or more processors are further configured to receive, over the one of the multiple CCs and based on transmitting the MPE report or the beam switching request, a beam switching command from the first cell or the multiple cells to switch to new beams on the multiple cells or CCs.

In Aspect 29, the apparatus of any of Aspects 24 to 28 includes wherein the one or more processors are configured to transmit the MPE report or the beam switching request on a MAC CE, a PUCCH, or layer 3 reporting.

In Aspect 30, the apparatus of any of Aspects 24 to 29 includes wherein the one or more processors are further configured to transmit, based on detecting the MPE event, one of the MPE report or the beam switching request to the first cell on the one of the multiple CCs.

In Aspect 31, the apparatus of any of Aspects 24 to 30 includes wherein the one or more processors are further configured to transmit, based on detecting the MPE event, a request to change a TDD pattern of a collection of symbols to at least one of the first cell or the second cell.

In Aspect 32, the apparatus of Aspect 31 includes wherein the one or more processors are further configured to receive, from at least one of the first cell or the second cell and in response to the request, a modified TDD pattern for the collection of symbols, and communicate over the one of the multiple CCs based on the modified TDD pattern.

In Aspect 33, the apparatus of any of Aspects 31 or 32 includes wherein the request identifies the first cell as a target cell for the change in TDD pattern.

In Aspect 34, the apparatus of any of Aspects 31 to 33 includes wherein the request indicates the change in TDD pattern.

Aspect 35 is an apparatus for wireless communication including a transceiver, a memory configured to store instructions, and one or more processors communicatively coupled with the memory and the transceiver, wherein the one or more processors are configured to determine a MPE event on one of multiple CCs configured with a device in inter-band CA, and transmit, to the device and based on detecting the MPE event, a beam switching command to switch to a new beam for uplink communications.

In Aspect 36, the apparatus of Aspect 35 includes wherein the one or more processors are configured to determine the MPE event based at least in part on receiving, from another cell having another one of the multiple CCs configured with the device, an indication to perform beam switching for the device.

In Aspect 37, the apparatus of any of Aspects 35 or 36 includes wherein the one or more processors are further configured to determine the MPE event at least in part by receiving a MPE report or beam switching request from the device.

In Aspect 38, the apparatus of any of Aspects 35 to 37 includes wherein the one or more processors are further configured to receive, from the device, a request to change a TDD pattern of a collection of symbols.

In Aspect 39, the apparatus of Aspect 38 includes wherein the one or more processors are further configured to generate, based at least in part on the request, a modified TDD pattern for the collection of symbols, and transmit an indication of the modified TDD pattern to the device.

In Aspect 40, the apparatus of any of Aspects 38 or 39 includes wherein the request identifies a target cell for the change in TDD pattern.

In Aspect 41, the apparatus of any of Aspects 38 to 40 includes wherein the request indicates the change in TDD pattern.

Aspect 42 is an apparatus for wireless communication including a transceiver, a memory configured to store instructions, and one or more processors communicatively coupled with the memory and the transceiver, wherein the one or more processors are configured to determine a MPE event on one of multiple CCs configured with a device in inter-band CA, and transmit, to another cell having another one of the multiple CCs configured with the device, an indication to perform beam switching for the device.

In Aspect 43, the apparatus of Aspect 42 includes wherein the one or more processors are configured to determine the MPE event includes receiving a MPE report or beam switching request from the device.

In Aspect 44, the apparatus of Aspect 43 includes wherein the MPE report or the beam switching request indicates one or more parameters including at least one of a band identifier, at least one cell identifier, at least one bandwidth part identifier, at least one uplink beam identifier of an original uplink beam, or at least one new beam identifier of a new uplink beam, and wherein the one or more processors are further configured to further determine the another cell based at least in part on the one or more parameters.

In Aspect 45, the apparatus of Aspect 44 includes wherein the band identifier identifies multiple cells or CCs on which the MPE event is detected, and wherein the one or more processors are further configured to transmit, to the multiple cells, the indication to perform beam switching for the device.

In Aspect 46, the apparatus of any of Aspects 43 to 45 includes wherein the one or more processors are further configured to receive the MPE report or the beam switching request on a MAC CE, a PUCCH, or layer 3 reporting.

Aspect 47 is an apparatus for wireless communication including means for detecting a MPE event on at least one of multiple CCs configured with a first cell in inter-band CA, and means for transmitting, based on detecting the MPE event, one of a MPE report or a beam switching request to a second cell on a different one of the multiple CCs.

In Aspect 48, the apparatus of Aspect 47 includes means for receiving, over the one of the multiple CCs and based on transmitting the MPE report or the beam switching request, a beam switching command from the first cell to switch to a new beam, and means for transmitting an uplink transmission to the first cell based on the new beam.

In Aspect 49, the apparatus of any of Aspects 47 or 48 includes wherein the first cell in inter-band CA uses a first frequency band which has at least a first CC, and the second cell in inter-band CA uses the first or a second frequency band which has at least a second CC.

In Aspect 50, the apparatus of any of Aspects 47 to 49 includes wherein the MPE report or the beam switching request indicates a band identifier, at least one cell identifier, at least one bandwidth part identifier, at least one uplink beam identifier of an original uplink beam, or at least one new beam identifier of a new uplink beam.

In Aspect 51, the apparatus of Aspect 50 includes wherein the band identifier identifies multiple cells or CCs on which the MPE event is detected, and further comprising means for receiving, over the one of the multiple CCs and based on transmitting the MPE report or the beam switching request, a beam switching command from the first cell or the multiple cells to switch to new beams on the multiple cells or CCs.

In Aspect 52, the apparatus of any of Aspects 47 to 51 includes wherein the means for transmitting transmits the MPE report or the beam switching request on a MAC CE, a PUCCH, or layer 3 reporting.

In Aspect 53, the apparatus of any of Aspects 47 to 52 includes means for transmitting, based on detecting the MPE event, one of the MPE report or the beam switching request to the first cell on the one of the multiple CCs.

In Aspect 54, the apparatus of any of Aspects 47 to 53 includes means for transmitting, based on detecting the MPE event, a request to change a TDD pattern of a collection of symbols to at least one of the first cell or the second cell.

In Aspect 55, the apparatus of Aspect 54 includes means for receiving, from at least one of the first cell or the second cell and in response to the request, a modified TDD pattern for the collection of symbols, and means for communicating over the one of the multiple CCs based on the modified TDD pattern.

In Aspect 56, the apparatus of any of Aspects 54 or 55 includes wherein the request identifies the first cell as a target cell for the change in TDD pattern.

In Aspect 57, the apparatus of any of Aspects 54 to 56 includes wherein the request indicates the change in TDD pattern.

Aspect 58 is an apparatus for wireless communication including means for determining a MPE event on one of multiple CCs configured with a device in inter-band CA, and means for transmitting, to the device and based on detecting the MPE event, a beam switching command to switch to a new beam for uplink communications.

In Aspect 59, the apparatus of Aspect 58 includes wherein the means for determining determines the MPE event based at least in part on receiving, from another cell having another one of the multiple CCs configured with the device, an indication to perform beam switching for the device.

In Aspect 60, the apparatus of any of Aspects 58 or 59 includes wherein the means for determining determines the MPE event at least in part by receiving a MPE report or beam switching request from the device.

In Aspect 61, the apparatus of any of Aspects 58 to 60 includes means for receiving, from the device, a request to change a TDD pattern of a collection of symbols.

In Aspect 62, the apparatus of Aspect 61 includes means for generating, based at least in part on the request, a modified TDD pattern for the collection of symbols, and means for transmitting an indication of the modified TDD pattern to the device.

In Aspect 63, the apparatus of any of Aspects 61 or 62 includes wherein the request identifies a target cell for the change in TDD pattern.

In Aspect 64, the apparatus of any of Aspects 61 to 63 includes wherein the request indicates the change in TDD pattern.

Aspect 65 is an apparatus for wireless communication including means for determining a MPE event on one of multiple CCs configured with a device in inter-band CA, and means for transmitting, to another cell having another one of the multiple CCs configured with the device, an indication to perform beam switching for the device.

In Aspect 66, the apparatus of Aspect 65 includes wherein the means for determining determines the MPE event at least in part by receiving a MPE report or beam switching request from the device.

In Aspect 67, the apparatus of Aspect 66 includes wherein the MPE report or the beam switching request indicates one or more parameters including at least one of a band identifier, at least one cell identifier, at least one bandwidth part identifier, at least one uplink beam identifier of an original uplink beam, or at least one new beam identifier of a new uplink beam, and further comprising means for determining the another cell based at least in part on the one or more parameters.

In Aspect 68, the apparatus of Aspect 67 includes wherein the band identifier identifies multiple cells or CCs on which the MPE event is detected, and further comprising means for transmitting, to the multiple cells, the indication to perform beam switching for the device.

In Aspect 69, the apparatus of any of Aspects 66 to 68 includes wherein the means for receiving receives the MPE report or the beam switching request on a MAC CE, a PUCCH, or layer 3 reporting.

Aspect 70 is a computer-readable medium including code executable by one or more processors for wireless communications, the code including code for detecting a MPE event on at least one of multiple CCs configured with a first cell in inter-band CA, and transmitting, based on detecting the MPE event, one of a MPE report or a beam switching request to a second cell on a different one of the multiple CCs.

In Aspect 71, the computer-readable medium of Aspect 70 includes code for receiving, over the one of the multiple CCs and based on transmitting the MPE report or the beam switching request, a beam switching command from the first cell to switch to a new beam, and code for transmitting an uplink transmission to the first cell based on the new beam.

In Aspect 72, the computer-readable medium of any of Aspects 70 or 71 includes wherein the first cell in inter-band CA uses a first frequency band which has at least a first CC, and the second cell in inter-band CA uses the first or a second frequency band which has at least a second CC.

In Aspect 73, the computer-readable medium of any of Aspects 70 to 72 includes wherein the MPE report or the beam switching request indicates a band identifier, at least one cell identifier, at least one bandwidth part identifier, at least one uplink beam identifier of an original uplink beam, or at least one new beam identifier of a new uplink beam.

In Aspect 74, the computer-readable medium of Aspect 73 includes wherein the band identifier identifies multiple cells or CCs on which the MPE event is detected, and further comprising code for receiving, over the one of the multiple CCs and based on transmitting the MPE report or the beam switching request, a beam switching command from the first cell or the multiple cells to switch to new beams on the multiple cells or CCs.

In Aspect 75, the computer-readable medium of any of Aspects 70 to 74 includes wherein the code for transmitting transmits the MPE report or the beam switching request on a MAC CE, a PUCCH, or layer 3 reporting.

In Aspect 76, the computer-readable medium of any of Aspects 70 to 75 includes code for transmitting, based on detecting the MPE event, one of the MPE report or the beam switching request to the first cell on the one of the multiple CCs.

In Aspect 77, the computer-readable medium of any of Aspects 70 to 76 includes code for transmitting, based on detecting the MPE event, a request to change a TDD pattern of a collection of symbols to at least one of the first cell or the second cell.

In Aspect 78, the computer-readable medium of Aspect 77 includes code for receiving, from at least one of the first cell or the second cell and in response to the request, a modified TDD pattern for the collection of symbols, and code for communicating over the one of the multiple CCs based on the modified TDD pattern.

In Aspect 79, the computer-readable medium of any of Aspects 77 or 78 includes wherein the request identifies the first cell as a target cell for the change in TDD pattern.

In Aspect 80, the computer-readable medium of any of Aspects 77 to 79 includes wherein the request indicates the change in TDD pattern.

Aspect 81 is a computer-readable medium including code executable by one or more processors for wireless communications, the code including code for determining a MPE event on one of multiple CCs configured with a device in inter-band CA, and transmitting, to the device and based on detecting the MPE event, a beam switching command to switch to a new beam for uplink communications.

In Aspect 82, the computer-readable medium of Aspect 81 includes wherein the code for determining determines the MPE event based at least in part on receiving, from another cell having another one of the multiple CCs configured with the device, an indication to perform beam switching for the device.

In Aspect 83, the computer-readable medium of any of Aspects 81 or 82 includes wherein the code for determining determines the MPE event at least in part by receiving a MPE report or beam switching request from the device.

In Aspect 84, the computer-readable medium of any of Aspects 81 to 83 includes code for receiving, from the device, a request to change a time division duplexing (TDD) pattern of a collection of symbols.

In Aspect 85, the computer-readable medium of Aspect 84 includes code for generating, based at least in part on the request, a modified TDD pattern for the collection of symbols, and code for transmitting an indication of the modified TDD pattern to the device.

In Aspect 86, the computer-readable medium of any of Aspects 84 or 85 includes wherein the request identifies a target cell for the change in TDD pattern.

In Aspect 87, the computer-readable medium of any of Aspects 84 to 86 includes wherein the request indicates the change in TDD pattern.

Aspect 88 is a computer-readable medium including code executable by one or more processors for wireless communications, the code including code for determining a MPE event on one of multiple CCs configured with a device in inter-band CA, and transmitting, to another cell having another one of the multiple CCs configured with the device, an indication to perform beam switching for the device.

In Aspect 89, the computer-readable medium of Aspect 88 includes wherein the code for determining determines the MPE event at least in part by receiving a MPE report or beam switching request from the device.

In Aspect 90, the computer-readable medium of Aspect 89 includes wherein the MPE report or the beam switching request indicates one or more parameters including at least one of a band identifier, at least one cell identifier, at least one bandwidth part identifier, at least one uplink beam identifier of an original uplink beam, or at least one new beam identifier of a new uplink beam, and further comprising code for determining the another cell based at least in part on the one or more parameters.

In Aspect 91, the computer-readable medium of Aspect 90 includes wherein the band identifier identifies multiple cells or CCs on which the MPE event is detected, and further comprising code for transmitting, to the multiple cells, the indication to perform beam switching for the device.

In Aspect 92, the computer-readable medium of any of Aspects 89 to 91 includes wherein the code for receiving receives the MPE report or the beam switching request on a MAC CE, a PUCCH, or layer 3 reporting.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
    a transceiver;
    a memory configured to store instructions; and
    one or more processors communicatively coupled with the memory and the transceiver, wherein the one or more processors are configured to:
        detect a maximum permissible exposure (MPE) event on at least one component carrier (CC) of multiple CCs, wherein the at least one CC is configured with a first cell in inter-band carrier aggregation (CA); and
        transmit, based on detecting the MPE event and on a different CC of the multiple CCs, one of a MPE report or a beam switching request, wherein the different CC is configured with a second cell in the inter-band CA.

2. The apparatus of claim 1, wherein the one or more processors are further configured to:
    receive, over the at least one CC and based on transmitting the MPE report or the beam switching request, a beam switching command from the first cell to switch to a new beam; and
    transmit an uplink transmission to the first cell based on the new beam.

3. The apparatus of claim 1, wherein the first cell in inter-band CA uses a first frequency band which has at least a first CC, and the second cell in inter-band CA uses the first frequency band or a second frequency band which has at least a second CC.

4. The apparatus of claim 1, wherein the MPE report or the beam switching request indicates a band identifier, at least one cell identifier, at least one bandwidth part identifier, at least one uplink beam identifier of an original uplink beam, or at least one new beam identifier of a new uplink beam.

5. The apparatus of claim 4, wherein the band identifier identifies multiple cells or CCs on which the MPE event is detected, and wherein the one or more processors are further configured to receive, over the at least one CC and based on transmitting the MPE report or the beam switching request, a beam switching command from the first cell or the multiple cells to switch to new beams on the multiple cells or CCs.

6. The apparatus of claim 1, wherein the one or more processors are configured to transmit the MPE report or the beam switching request on a media access control (MAC) control element (CE), a physical uplink control channel (PUCCH), or layer 3 reporting.

7. The apparatus of claim 1, wherein the one or more processors are further configured to transmit, based on detecting the MPE event, one of the MPE report or the beam switching request to the first cell on the at least one CC.

8. The apparatus of claim 1, wherein the one or more processors are further configured to transmit, based on detecting the MPE event, a request to change a time division duplexing (TDD) pattern of a collection of symbols to at least one of the first cell or the second cell.

9. The apparatus of claim 8, wherein the one or more processors are further configured to:
- receive, from at least one of the first cell or the second cell and in response to the request, a modified TDD pattern for the collection of symbols; and
- communicate over the at least one CC based on the modified TDD pattern.

10. The apparatus of claim 8, wherein the request identifies the first cell as a target cell for the change in TDD pattern.

11. The apparatus of claim 8, wherein the request indicates the change in TDD pattern.

12. A method for wireless communications at a user equipment (UE), comprising:
- detecting a maximum permissible exposure (MPE) event on at least one component carrier (CC) of multiple CCs, wherein the at least one CC is configured with a first cell in inter-band carrier aggregation (CA); and
- transmitting, based on detecting the MPE event and on a different CC of the multiple CCs, one of a MPE report or a beam switching request to a second cell on a different CC of the multiple CCs, wherein the different CC is configured with a second cell in the inter-band CA.

13. The method of claim 12, further comprising:
- receiving, over the at least one CC and based on transmitting the MPE report or the beam switching request, a beam switching command from the first cell to switch to a new beam; and
- transmitting an uplink transmission to the first cell based on the new beam.

14. The method of claim 12, wherein the first cell in inter-band CA uses a first frequency band which has at least a first CC, and the second cell in inter-band CA uses the first frequency band or a second frequency band which has at least a second CC.

15. The method of claim 12, wherein the MPE report or the beam switching request indicates a band identifier, at least one cell identifier, at least one bandwidth part identifier, at least one uplink beam identifier of an original uplink beam, or at least one new beam identifier of a new uplink beam.

16. The method of claim 15, wherein the band identifier identifies multiple cells or CCs on which the MPE event is detected, and further comprising receiving, over the at least one CC and based on transmitting the MPE report or the beam switching request, a beam switching command from the first cell or the multiple cells to switch to new beams on the multiple cells or CCs.

17. The method of claim 12, wherein transmitting the MPE report or the beam switching request includes transmitting the MPE report or the beam switching request on a media access control (MAC) control element (CE), a physical uplink control channel (PUCCH), or layer 3 reporting.

18. The method of claim 12, further comprising transmitting, based on detecting the MPE event, one of the MPE report or the beam switching request to the first cell on the at least one CC.

* * * * *